United States Patent
Bhardwaj (10) Patent No.: US 10,740,165 B2
(45) Date of Patent: Aug. 11, 2020

(54) EXTENDING THE ERROR CORRECTION CAPABILITY OF A DEVICE USING A NEURAL NETWORK

(71) Applicant: Western Digital Corporation, San Jose, CA (US)

(72) Inventor: Amit Bhardwaj, Bangalore (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 28 days.

(21) Appl. No.: 16/208,133

(22) Filed: Dec. 3, 2018

(65) Prior Publication Data

US 2020/0174864 A1 Jun. 4, 2020

(51) Int. Cl.
G06F 11/07 (2006.01)
G06N 3/04 (2006.01)
G06F 17/18 (2006.01)

(52) U.S. Cl.
CPC .......... *G06F 11/073* (2013.01); *G06F 11/076* (2013.01); *G06F 11/0793* (2013.01); *G06F 17/18* (2013.01); *G06N 3/04* (2013.01)

(58) Field of Classification Search
CPC ............... G06F 11/0793; G06F 11/076; G06F 11/1073; G06F 11/07; G06N 3/04; G06N 3/0635; G06N 3/084; G06N 3/02; G11C 29/42; G11C 29/52
See application file for complete search history.

(56) References Cited

U.S. PATENT DOCUMENTS

2018/0357530 A1* 12/2018 Beery .................... G06N 3/084
2019/0044542 A1* 2/2019 Hogaboam .......... G06N 3/0635

OTHER PUBLICATIONS

Haroon et al., Decoding of error correcting codes using neural networks, 2012, Blekinge Institute of Technology, (retrieved from google Feb. 24, 2020), pp. 1 to 67.*
Ja-Ling Wu et al., Neural network decoders for linear block codes, 2002, International journal of computation engineering science, vol. 3, No. 3, pp. 235 to 255.*
Navneet Agrawal, Maching intelligence in decoding of forward error correction codes, 2017, Degree Project information and Communication Technology, KTH Royal institute of technology school of electrical engineering (retrieved from google Feb. 24, 2020).*
Yua, et al., Neural net decoders for some block codes, 1990, IEEE, pp. 309-314.*

* cited by examiner

*Primary Examiner* — Shelly A Chase
(74) *Attorney, Agent, or Firm* — Rowan TELS LLC (57) ABSTRACT

A codeword decoder interoperates with a neural network to provide the neural network with an uncorrectable erroneous codeword and to classify the uncorrectable erroneous codeword into a correctable erroneous codeword. The codeword decoder and neural network may be utilized in the error correction unit for a memory array.

19 Claims, 5 Drawing Sheets

EXTENDING THE ERROR CORRECTION CAPABILITY OF A DEVICE USING A NEURAL NETWORK

BACKGROUND

Technical Field

This disclosure is directed to error correction mechanisms for machine memories that utilize error correcting codes, and more particularly, to improving the error correction capability of said machines.

Description of the Related Art

Storing and transmitting data to and from machine memories is at times susceptible to errors. Errors in data may manifest themselves in one or more bits having values opposite than what is intended (e.g., a logic one instead of an intended logic zero). These are sometimes referred to as bit-flips or bit errors. If left uncorrected, these errors can render the data in which they are contained to be unusable or significantly degraded. For example, one or more uncorrected errors in an image file may alter the appearance of the corresponding image if not otherwise rendering the file unusable. In order to counter the effects of errors in data, many computer memory systems utilize error detection and correction mechanisms. Such mechanisms may be used to detect the presence of errors and if possible correct the errors.

Due to factors known in the art, the capability of error correcting codes to correct bit errors in codewords may be overwhelmed resulting in an uncorrectable erroneous codeword.

BRIEF SUMMARY

An error correction unit for use with memory arrays utilizes a neural network trained on memory test results including erroneous codewords, average bit error rate, and memory array health parameters such as block health statistics. Once trained and deployed, the neural network may be invoked by the error correction unit upon encountering an uncorrectable erroneous codeword. The neural network classifies the uncorrectable erroneous codeword into a prediction of a correctable erroneous codeword or returns an indication that it could not identify a corresponding correctable erroneous codeword.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

A neural network may be operated in conjunction with a codeword decoder to enhance the error correction capability of a device that utilizes memory arrays. The neural network is trained specifically on noisy codewords from and characteristics of the memory array with which it will be paired in the device. "Noisy codewords" refers to codewords having at least one bit error.

Once trained and operational, the neural network transforms a codeword determined by the decoder to be an uncorrectable erroneous codeword (e.g., due to having too many bit errors) into a prediction or classification of a corresponding correctable erroneous codeword. The correctable erroneous codeword also comprises bit errors but the number of these are within the error correction capability of the error correcting code of the correctable erroneous codeword. In other words the correctable erroneous codeword has a reduced bit error count relative to the uncorrectable erroneous codeword.

The trained neural network may be utilized in any memory environment to improve the error correction capability of the system. Example applications include use with flash memories, DDR memories, SSD memories, hard drives including magnetic and optical drives, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (for example, single-level cell (SLC) memory, multi-level cell (MLC) memory, or any combination thereof), NOR memory, EEPROM, Ferroelectric Memory (FeRAM), Magnetoresistive RAM (MRAM), other discrete volatile or Non-Volatile Memory (NVM) technologies, or any combination thereof.

In some embodiments, once deployed the neural network will typically be activated when the error correction unit encounters a codeword with so many bit errors that the codeword is determined to be an uncorrectable erroneous codeword. In other words the codeword decoder operates independently of the neural network except when uncorrectable erroneous codewords are detected. The neural network may be inactive otherwise, which in most memory systems will be the vast majority of the time.

Examples of memory array health parameters that may be utilized by the neural network (e.g., during training and to make predictions once deployed) include: information about word lines in the memory array from which the codeword was read or word lines proximate thereto, known error regions in the block of the memory array from which the codeword was read, block PE (program erase) cycle, retention time since a last write of the codeword, and other memory array health parameters known in the art.

Exemplary Error Correction Unit

Figure 1:
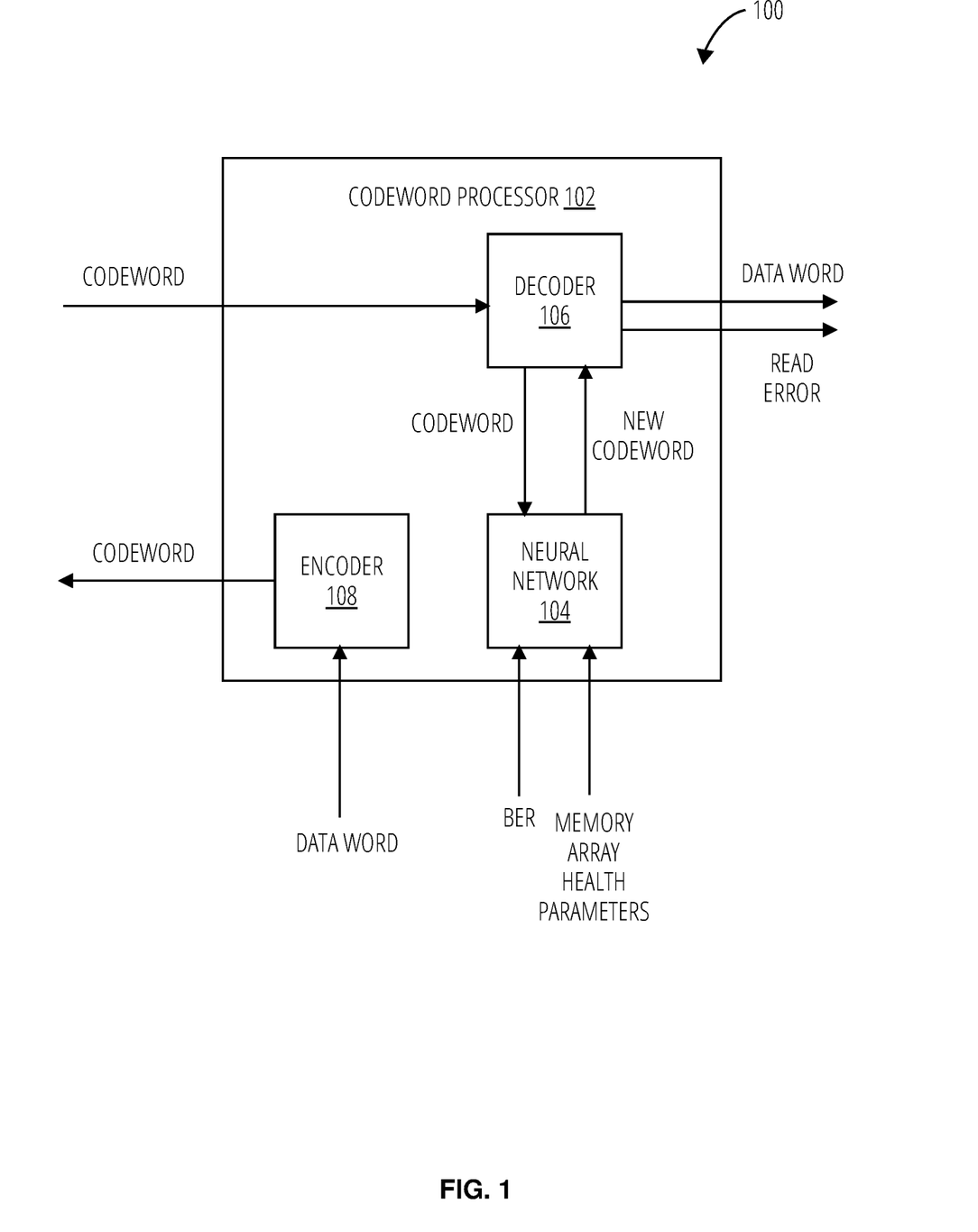
FIG. 1 illustrates an error correction unit 100 in accordance with one embodiment.

FIG. 1 illustrates an error correction unit 100 in one embodiment. The error correction unit 100 comprises an error-correction code processor 102 that comprises a neural network 104, a decoder 106, and an encoder 108. The error correction unit 100 may also include other logic blocks as known in the art.

During writes to a memory array (not shown in FIG. 1), the encoder 108 generates an error correcting code for the data word to write and appends or otherwise combines the error correcting code with the data word to generate a codeword that is then stored in the memory array.

During reads from the memory array the decoder 106 receives a codeword from the memory array and determines (e.g., by performing a calculation) if the code word includes any bit errors and whether the bit errors are correctable using the error correcting code of the codeword. If there are bit errors and they are correctable the codeword is a correctable erroneous codeword and the decoder 106 applies the error correcting code of the codeword to correct the codeword and outputs the data word portion.

If there are bit errors in the codeword that are not correctable then the codeword is an uncorrectable erroneous codeword and the error-correction code processor 102 (e.g., the decoder 106) activates the neural network 104 with inputs including the uncorrectable erroneous codeword, runtime bit error rate for the memory array, and memory array health parameters.

The neural network 104 operates on these inputs to output either:
1. A correctable erroneous codeword corresponding to the uncorrectable erroneous codeword; or
2. An error signal indicating that the uncorrectable erroneous codeword does not correspond to a correctable erroneous codeword.

In the latter case the decoder 106 will typically output a read error.

While the example embodiments disclosed herein are shown as being applicable to correct data stored in memory, in certain embodiments, the neural network described may be used to correct data transmitted along a data path or communication link. In those cases, the decoder may receive data that is being transmitted, rather than read from a memory.

Exemplary Neural Network

Figure 2:
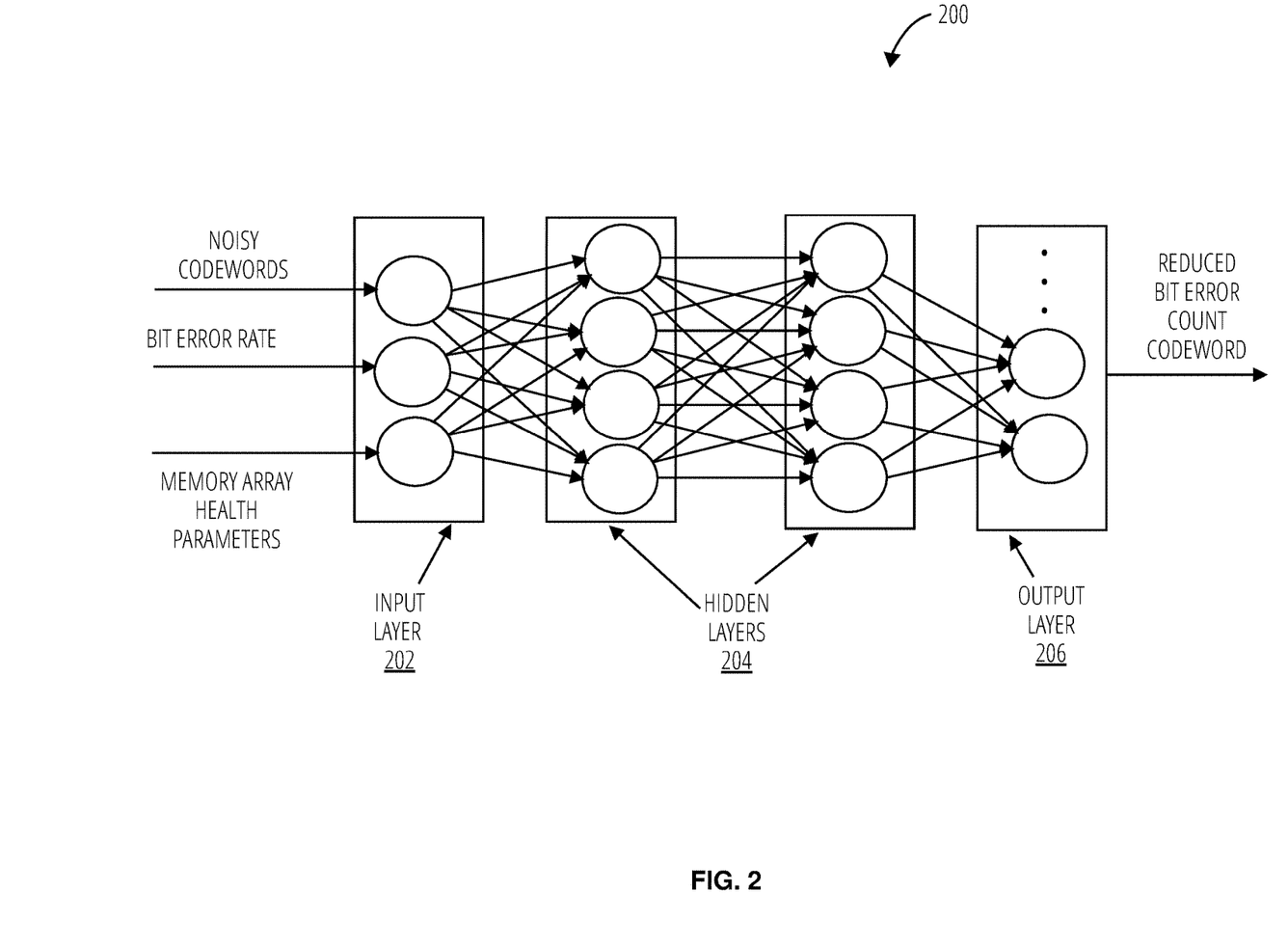
FIG. 2 illustrates a neural network 200 in accordance with one embodiment.

FIG. 2 illustrates a neural network 200 in one embodiment. At a high level, the neural network 200 comprises an input layer 202, two or more hidden layers 204, and an output layer 206. The neural network 200 comprises a collection of connected units or nodes called artificial neurons which loosely model the neurons in a biological brain. Each connection, like the synapses in a biological brain, can transmit a signal from one artificial neuron to another. An artificial neuron that receives a signal can process it and then signal additional artificial neurons connected to it.

In a typical embodiment the signal at a connection between artificial neurons is a real number, and the output of each artificial neuron is computed by some non-linear function (the activation function) of the sum of its inputs. The connections between artificial neurons are called 'edges' or axons. Artificial neurons and edges typically have a weight that adjusts as learning proceeds. The weight increases or decreases the strength of the signal at a connection. Artificial neurons may have a threshold (trigger threshold) such that the signal is only sent if the aggregate signal crosses that threshold. Typically, artificial neurons are aggregated into layers. Different layers may perform different kinds of transformations on their inputs. Signals propagate from the first layer (the input layer 202), to the last layer (the output layer 206), possibly after traversing one or more intermediate layers, called hidden layers 204.

In one embodiment the neural network 200 comprises a series of hidden layers in which each neuron is fully connected to neurons of the next layer. The neural network 200 may utilize an activation function such as sigmoid or ReLU, for example. "ReLU" refers to a rectifier function, an activation function defined as the positive part of its input. It is also known as a ramp function and is analogous to half-wave rectification in electrical signal theory. "Sigmoid function" refers to a function of the form $f(x)=1/(exp(-x))$. The sigmoid has the property of mapping a wide range of input values to the range 0-1, or sometimes −1 to 1.

Another activation function that may be utilized in some embodiments in the hyperbolic tangent function, a function of the form $\tan h(x) = \sin h(x)/\cos h(x)$. Like the sigmoid, the tan h function is also sigmoidal ("s"-shaped), but instead outputs values that range (−1, 1). Thus, strongly negative inputs to the tan h will map to negative outputs. Additionally, only zero-valued inputs are mapped to near-zero outputs. These properties make the network less likely to get "stuck" during training.

The last layer in the neural network implements a function such as SoftMax to produce the classified or predicted correctable erroneous codeword. "SoftMax" refers to a function of the form $f(xi)=exp(xi)/sum(exp(x))$ where the sum is taken over a set of x. SoftMax is used at different layers (often at the output f) of artificial neural networks to predict classifications for inputs to those layers. The SoftMax function calculates the probabilities distribution of the event xi over 'n' different events. In general sense, this function calculates the probabilities of each target class over all possible target classes. The calculated probabilities are helpful for predicting that the target class is represented in the inputs. The main advantage of using SoftMax is the output probabilities range. The range will 0 to 1, and the sum of all the probabilities will be equal to one. If the SoftMax function used for multi-classification model it returns the probabilities of each class and the target class will have the high probability. The formula computes the exponential (e-power) of the given input value and the sum of exponential values of all the values in the inputs. Then the ratio of the exponential of the input value and the sum of exponential values is the output of the SoftMax function.

The neural network 200 will typically comprise a plurality of fully-connected hidden layers, and in one embodiment all layers of the neural network are fully-connected layers. In some embodiments there are between 2 and 20 hidden layers, inclusive, each comprising exactly N neurons where N is a bit length of codewords processed by the decoder 106. The Softmax output layer may also comprise N neurons. More generally the neural network 200 may comprise between 2 and N/2 hidden layers, inclusive.

The input layer 202 of the neural network 200 may receive noisy codewords, a runtime bit error rate, and memory array health parameters for the memory array for which the neural network is trained. The input layer 202 may comprise a first neuron to receive the noisy codewords during training (and the uncorrectable erroneous codeword during operation), a second neuron to receive the test and runtime bit error rate, and a third neuron to receive the test and runtime memory array health parameters.

An example of code listings to implement a neural network in accordance with these principles is included at the end of this section.

The neural network 200 is trained prior to deployment and to conserve operational resources will typically not undergo further training once operational. However some embodiments may utilize ongoing training of the neural network 200 especially when operational resource constraints such as die area and performance are less critical, and as such may be beneficial when the memory's characteristics change over time due to use.

Exemplary Artificial Neuron

Figure 3:
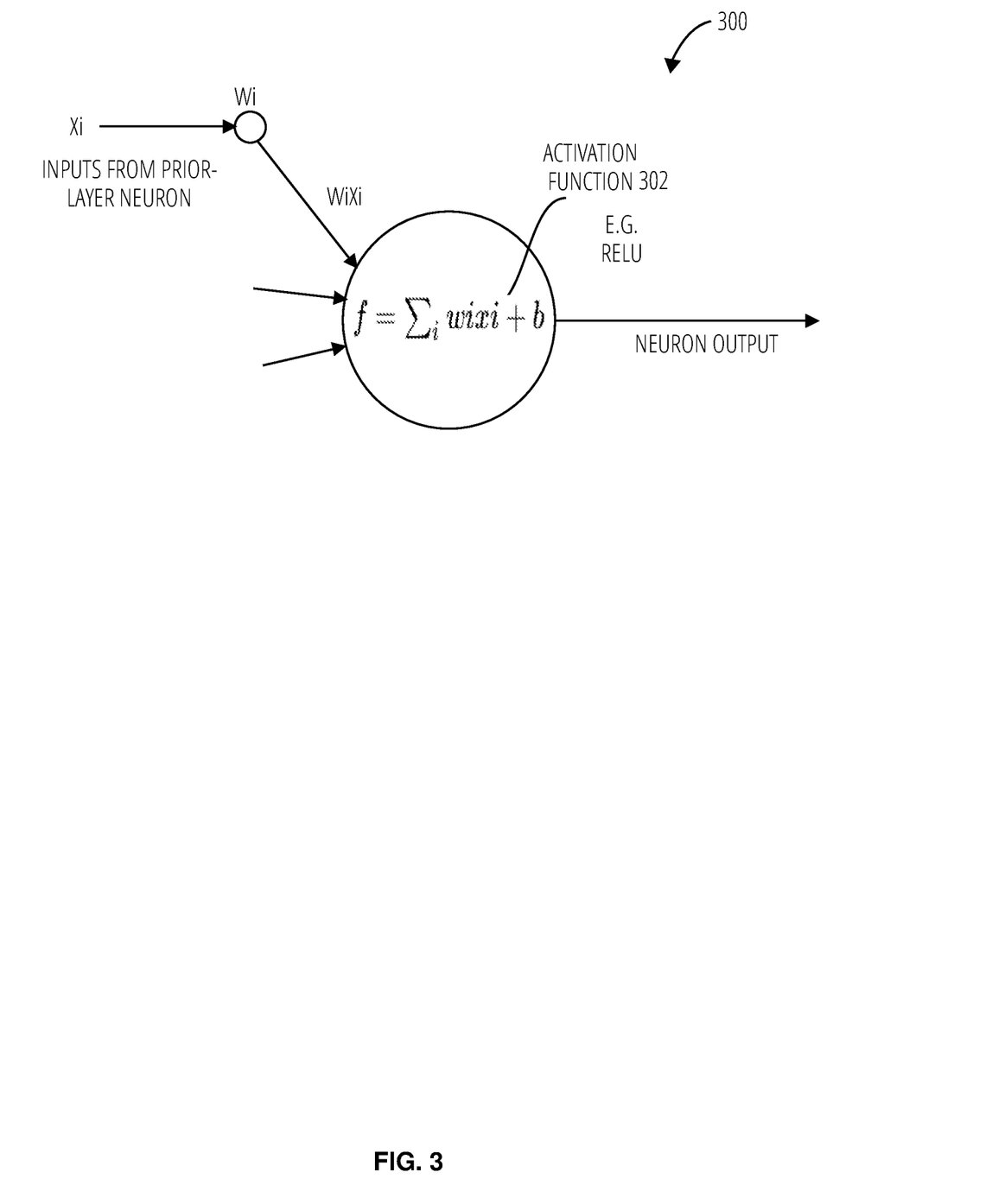
FIG. 3 illustrates an artificial neuron 300 in accordance with one embodiment.

Referring to FIG. 3, an artificial neuron 300 embodiment for use in the neural network 200 receives inputs from predecessor neurons comprising. The artificial neuron 300 includes:
  inputs $x_i$;
  weights $w_i$ applied to the inputs;

an optional threshold (b), which stays fixed unless changed by a learning function; and an activation function 302 that computes the output from the previous neuron inputs and threshold, if any.

An input neuron (e.g., of the input layer 202) has no predecessor but serves as input interface for the whole network. Similarly an output neuron (e.g., of the output layer 206) has no successor and thus serves as output interface of the whole network.

The neural network 200 includes connections, each connection transferring the output of a neuron in one layer to the input of a neuron in a next layer. Each connection carries an input x and is assigned a weight w.

The activation function 302 often has the form of a sum of products of the weighted values of the inputs of the predecessor neurons.

The learning rule is a rule or an algorithm which modifies the parameters of the neural network, in order for a given input to the network to produce a favored output. This learning process typically involves modifying the weights and thresholds of the neurons and connections within the neural network 200.

For learning the neural network 200 may utilize a gradient decent backpropagation algorithm to adjust the weights of neurons in the hidden layers. "Backpropagation" refers to an algorithm to calculate a gradient that is needed in the calculation of the weights to be used in the network. For backpropagation, the loss function calculates the difference between the network output and its expected output, after a case propagates through the network. The weight adjustments may be calculated by gradient of the loss function which is a number of misclassified errors in the codewords. The "loss function", also referred to as the cost function or error function (not to be confused with the Gauss error function), is a function that maps values of one or more variables onto a real number intuitively representing some "cost" associated with those values.

The training phase may be divided into a propagation phase in which output and cost are generated, and a weight update phase to update the weights to reduce the loss, based on a configured learning rate. The learning rate influences the speed and quality of learning. Training is performed to a desired accuracy.

Exemplary Memory Device

Figure 4:
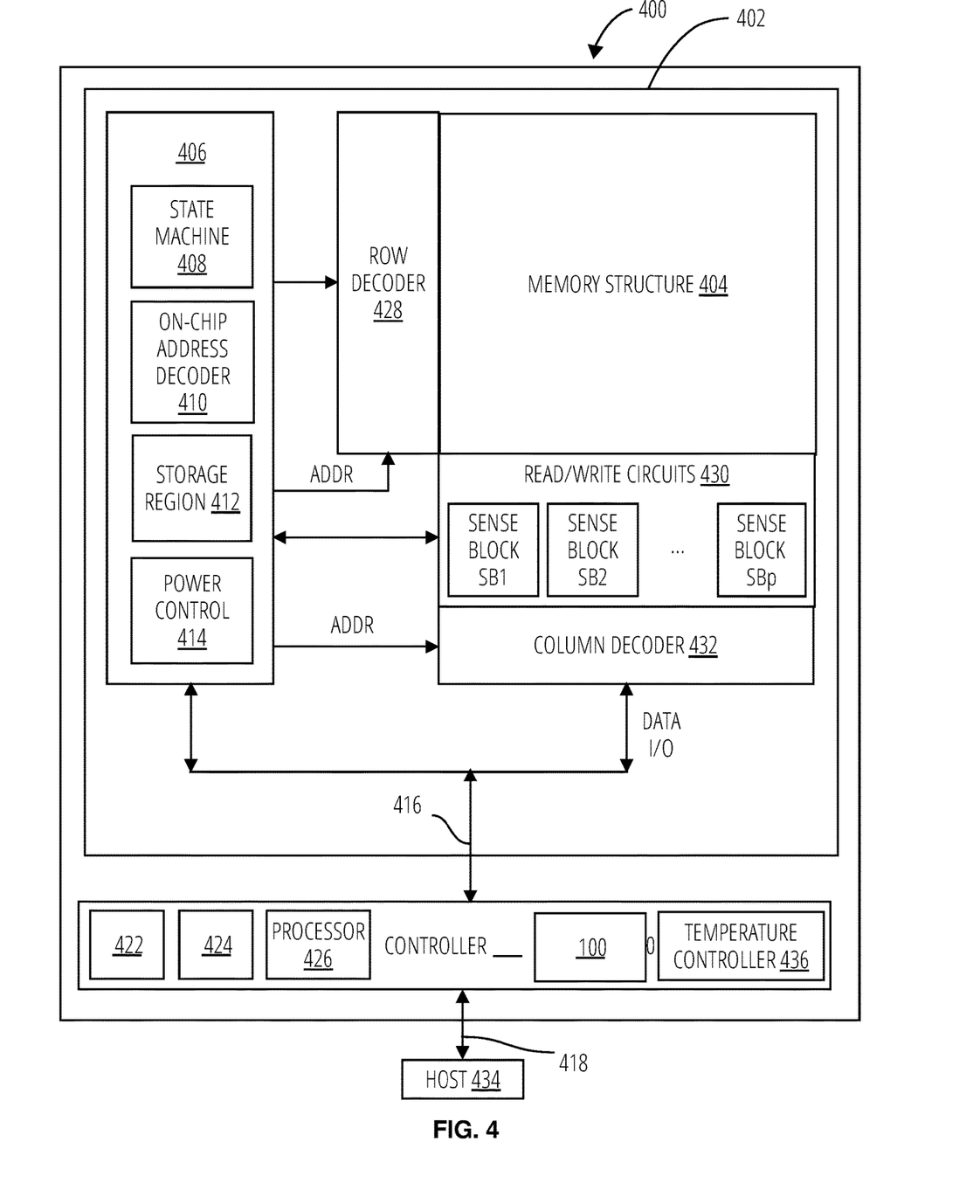
FIG. 4 is a block diagram of an example memory device 400.

FIG. 4 is a block diagram of an exemplary memory device 400 that may utilize the error correction unit 100. The memory device 400 may include one or more memory die 402. The memory die 402 includes a memory structure 404 of memory cells, such as an array of memory cells herein referred to as a memory array, address controller 406, and read/write circuits 430. The memory structure 404 is addressable by word lines via a row decoder 428 and by bit lines via a column decoder 432. The read/write circuits 430 include multiple sense blocks SB1, SB2, . . . , SBp (sensing circuitry) and allow a page of memory cells to be read or programmed in parallel. Typically a read/write controller 420 is included in the same memory device 400 (e.g., a removable storage card) as the one or more memory die 402. Commands and data are transferred between the host device 434 and read/write controller 420 via a data bus 418, and between the controller and the one or more memory die 402 via lines 416.

The error correction unit 100 may be included in the read/write controller 420 in a typical embodiment. The read/write controller 420 may provide memory array health parameters to the neural network 104 and codewords to the decoder 106 during operation of the memory device 400. In some embodiments additional memory array health parameters may take the form of readings from the temperature controller 436, and these may be applied during training and operation of the neural network 104. Operational temperature is known to affect the operational characteristics of memory arrays.

The memory structure 404 can be two-dimensional (2D) (laid out in a single fabrication plane) or three-dimensional (3D) (laid out in multiple fabrication planes). The memory structure 404 may comprise one or more array of memory cells including a 3D array. In one embodiment, the memory structure 404 may comprise a monolithic three-dimensional memory structure (3D array) in which multiple memory levels are formed above (and not in) a single substrate, such as a wafer, with no intervening substrates. The memory structure 404 may comprise any type of non-volatile memory that is monolithically formed in one or more physical levels of arrays of memory cells having an active area disposed above a silicon substrate. The memory structure 404 may be in a non-volatile memory device (e.g. Memory device 400) having circuitry associated with the operation of the memory cells, whether the associated circuitry is above or within the substrate.

The address controller 406 cooperates with the read/write circuits 430 to perform memory operations on memory cells of the memory structure 404, and includes a state machine 408, an address decoder 410, a temperature controller 436, and a power control 414. The state machine 408 provides chip-level control of memory operations. A store region selector 412 may be provided, e.g., for programming parameters as described further below.

The address decoder 410 provides an address interface between that used by the host or a read/write controller 420 to the hardware address used by the row decoder 428 and column decoder 432. The power control 414 controls the power and voltages supplied to the various control lines during memory operations. The power control 414 and/or read/write circuits 430 can include drivers for word lines, source gate select (SGS) transistors, drain gate select (DGS) transistors, bit lines, substrates (in 2D memory structures), charge pumps, and source lines. The power control 414 can therefore include various first voltage generators (e.g., the drivers) to generate the voltages described herein. The sense blocks can include bit line drivers and sense amplifiers in one approach.

An SGS transistor is a select gate transistor at a source end of a memory string, and a DGS transistor is a select gate transistor at a drain end of a memory string.

In some implementations, some of the components can be combined. In various designs, one or more of the components (alone or in combination), other than memory structure 404, can be thought of as at least one control circuit or controller which is configured to perform the techniques described herein. For example, a control circuit may include any one of, or a combination of, address controller 406, state machine 408, address decoder 410, column decoder 432, power control 414, control processor 426, sense blocks SB1, SB2, . . . , SBp, read/write circuits 430, read/write controller 420, and so forth.

The read/write controller 420 may comprise a control processor 426, memory devices (memory) such as controller read-only memory 422 and controller volatile memory 424 and an error-correction code processor 102. The error-correction code processor 102 can correct a number of read errors which are caused by noise, crosstalk, radiation and other factors.

The memory devices of the read/write controller 420 may comprise code such as a set of instructions, and the control processor 426 is operable to execute the set of instructions to provide aspects of the functionality described herein. Alternatively or additionally, the control processor 426 can access code from the memory structure 404, such as a reserved area of memory cells in one or more word lines.

For example, code can be used by the read/write controller 420 to access the memory structure 404 such as for programming, read and erase operations. The code can include boot code and control code (e.g., set of instructions). The boot code is software that initializes the read/write controller 420 during a booting or startup process and enables the read/write controller 420 to access the memory structure 404. The code can be used by the read/write controller 420 to control one or more memory structures. In one embodiment, upon being powered up, the control processor 426 fetches the boot code from the controller read-only memory 422 or memory structure 404 for execution, and the boot code initializes the system components and loads the control code into the controller volatile memory 424. Once the control code is loaded into the controller volatile memory 424, it is executed by the control processor 426. The control code includes drivers to perform basic tasks such as controlling and allocating memory, prioritizing the processing of instructions, and controlling input and output ports.

Generally, the control code can include instructions to perform the functions described herein. The control code can implement a sequencer to control the timing (start and stop times, durations, spacing etc.) of the various signals described herein. The state machine 408 may also be utilized to implement aspects of the sequencer.

In one embodiment, the host device 434 is a computing device (e.g., laptop, desktop, smartphone, tablet, digital camera) that includes one or more processors, one or more processor readable storage devices (e.g., RAM, ROM, flash memory, hard disk drive, solid state memory) that store processor readable code (e.g., software) for programming the one or more processors to perform the methods described herein. The host may also include additional system memory, one or more input/output interfaces and/or one or more input/output devices in communication with the one or more processors, as well as other components well known in the art.

The store region selector 412 may be a non-volatile memory such as NAND flash memory, or another type.

Examples of non-volatile and volatile memory types that may be utilized in the memory device 400 include dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse or phase change material, and optionally a steering element, such as a diode or transistor. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND string is an example of a set of series-connected transistors comprising memory cells and select gate transistors.

A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that the disclosed embodiments are not limited to the two-dimensional and three-dimensional exemplary structures described but applicable to all relevant memory structures within the spirit and scope of the technology as described herein and as understood by one of skill in the art.

Exemplary Memory Array

Figure 5:
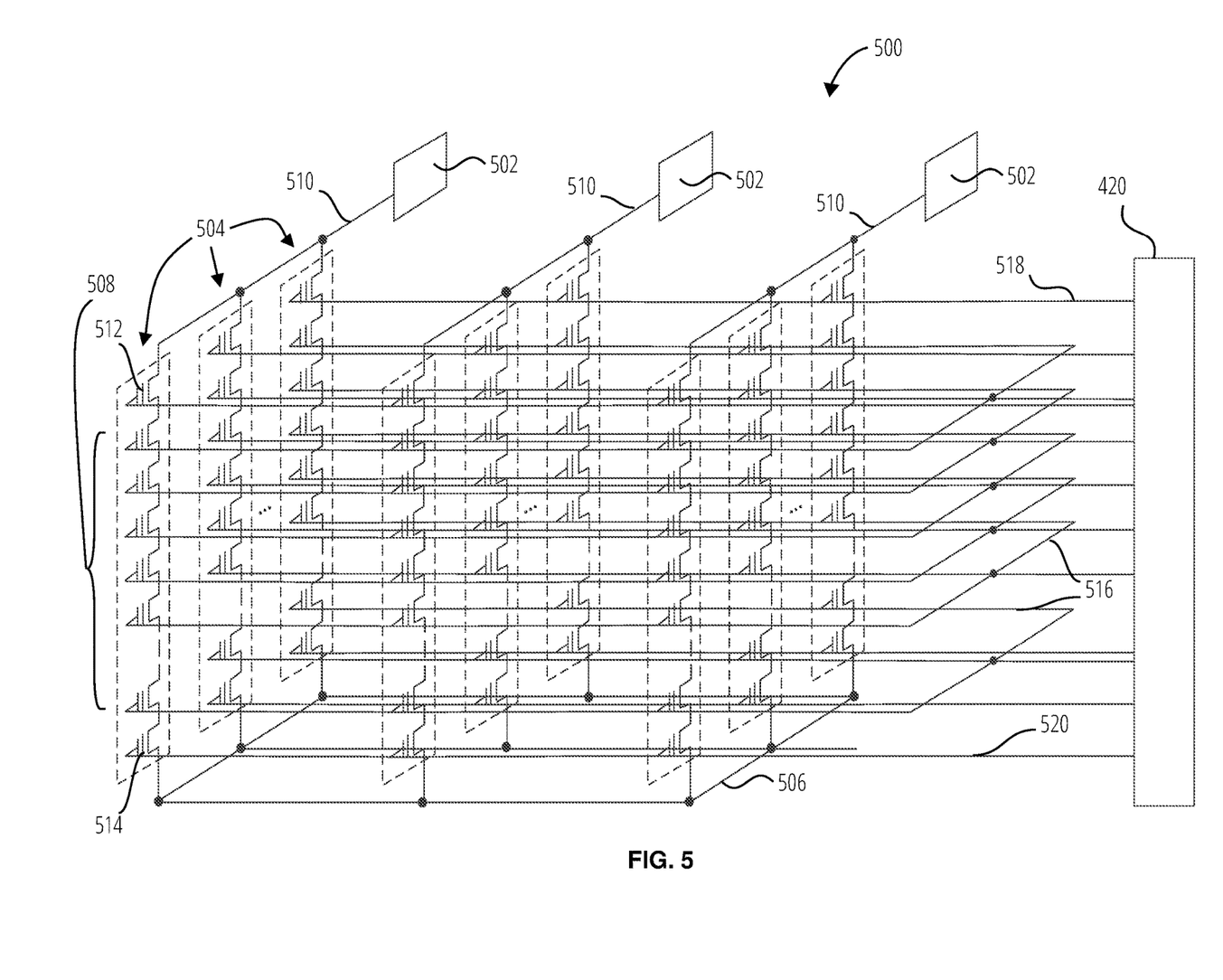
FIG. 5 illustrates a 3D memory array 500 in accordance with one embodiment.

FIG. 5 is a perspective view that illustrates the 3D memory array 500 in more detail. Each of the bit lines 510 is coupled to a sense amplifier 502. Each of the memory strings 504 comprises many memory cells 508 between the bit lines 510 and a source line 506. A drain-side select gate 512 of each of the memory strings 504 couples the memory strings 504 to the bit lines 510. Likewise each of the memory strings 504 is coupled to the source line 506 via a source-side select gate 514. A read/write controller 420 drives the drain-side select gate 512 of each of the memory strings 504 via a drain gate control line 518, and drives the source-side select gate 514 of each of the memory strings 504 via a source gate control line 520. The read/write controller 420 is also coupled to each of the memory cells 508 via word lines 516. Memory array health parameters including information about the word lines 516 associated or proximate to an uncorrectable erroneous codeword may be provided by the read/write controller 420 to the neural network 104 for purposes of determining a correctable erroneous codeword corresponding to an uncorrectable erroneous codeword read from the 3D memory array 500.

The techniques described herein may of course also be utilized in 2D memory arrays.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Code Listings

```
m=30;
n=511
k=259;
nwords=100000;
msgWrite=gf(randi([0 1],nwords,k)); % Messages to write in NAND
enc=bchenc(msgWrite,n,k); % Generate the BCH encoded message(msg+parity)
% neural network implementation
% NN1: Take a msg and pb and return a msg
% NN2: Take a msg and pb and return a pb
% NN3: Take a msg and return a pb
inputsMsgPb=enc.x;
outputsMsg=msgWrite.x;
outputsPBgf=enc(:,260:511);
outputsPB=outputsPBgf.x;
inputsMsg=msgWrite.x;
% NN1
inputsNN=double(inputsMsgPb');
outputsNN=double(outputsMsg');
net1=fitnet(15); % Number of Hidden Layers
net1.trainFcn='trainscg';
[net1,tr1]=train(net1,inputsNN,outputsNN);
% NN2
inputsNN=double(inputsMsgPb');
outputsNN=double(outputsPB');
net2=fitnet(15); % Number of Hidden Layers
net2.trainFcn='trainscg';
[net2,tr2]=train(net2,inputsNN,outputsNN);
% NN3
inputsNN=double(inputsMsg');
outputsNN=double(outputsPB');
net3=fitnet(15); % Number of Hidden Layers
net1.trainFcn='trainscg';
[net3,tr3]=train(net3,inputsNN,outputsNN);
nwords=1000;
msgWrite=gf(randi([0 1],nwords,k)); % Messages to write in NAND
enc=bchenc(msgWrite,n,k); % Generate the BCH encoded message(msg+parity)
t=m+1; % introduce error 1 more than correction capability
noisycode=enc+randerr(nwords,n,31); % Errorneous codeword
[msgRx,numerr,ccode]=bchdec(noisycode,n,k); % BCH should fail to correct few codewords
fprintf('No. of errors after BCH Decoding\n')
unique(numerr)
histc(numerr,unique(numerr)) % print the error type and its count. −1 indicates decoding fails while other number specify the bits corrected
diffmsg1=xor(msgRx.x,msgWrite.x);
countdiffmsg1=sum(diffmsg1,2);
[counts3,binCenters3]=hist(countdiffmsg1,unique(countdiffmsg1));
noisyX=double(noisycode.x'); % Errorenous codeword as input
noisyT=double(msgWrite.x'); % Error free messages as target
noisyMsg=noisyX(1:259,:);
noisyMsg1=net1(noisyX);
pb=noisyX(260:511,:);
noisyPb1=net2(noisyX);
noisyPb2=net3(noisyX(1:259,:));
pb2=zeros(252,1000);
for row=1:252
  for col=1:1000
    pb2(row,col)=mode([noisyPb1(row,col),noisyPb2(row,col),pb(row,col)]);
```

```
    end
    end
    noisyX(260:511,:)=pb2;
    noisyMsg2=net1(noisyX);
    msgDec=zeros(259,1000);
    for row=1:259
    for col=1:1000
    msgDec(row,col)=mode([noisyMsg(row,col),noisyMsg1
        (row,col),noisyMsg2(row,col)]);
    end
    end
    noisyX(1:259,:)=msgDec;
    codeword1=noisyX;
    codeword1=codeword1>0.2;
    [msgRx2,numerr2]=bchdec(gf(codeword1'),n,k);
    fprintf('No of errors after 2nd Iteration of BC H
decoding\n')
    unique(numerr2)
    histc(numerr2,unique(numerr2)) % print error type and its
count after applying BCH decoder on NN output. This is 2nd
time BCH is applied on noisy codewords. −1 specifies
decodi
    diffmsgWrite2=xor(msgRx2.x,msgWrite.x);
    countdiffmsgWrite2=sum(diffmsgWrite2,2);
    fprintf('Difference between msg written and msg decoded
with BCH-NN-BCH\n')
    unique(countdiffmsgWrite2)
    histc(countdiffmsgWrite2,unique(countdiffmsgWrite2))
% compare output of BCH-NN-BCH with the accurate
message for bit errors. Noisy codeword is passed through
BCH-NN-BCH loop.
    [counts2,binCenters2]=hist(countdiffmsgWrite2,unique
(countdiffmsgWrite2)) % compare output of BCH-NN-BCH
with the accurate message for bit errors. Noisy codeword is
passed through BCH-NN-BCH loop.
    figure % generate a plot
    plot(binCenters2,counts2,'g-');
    hold on;
    plot(binCenters3,counts3,'b-');
    title('Fit Net 30 bits—NN acts on complete codeword')
    xlabel('Errors')
    ylabel('Frequency')
    legend1=sprintf('NN-BCH output');
    legend2=sprintf('BCH output');
    legend({legend1,legend2});
    fprintf('Accuracy of decoding without NN-BCH loop %
0.2f\n',sum(numerr~=−1)/nwords) % calculate the accuracy
of BCH for decoding.
    fprintf('Accuracy of decoding with BCH-NN-BCH loop
% 0.2f\n',sum(numerr2~=−1)/nwords) % calculate the accu-
racy of BCH-NN-BCH for decoding.
    fprintf('Accuracy of correct decoding with BCH-NN-
BCH loop % 0.2f\n',sum(countdiffmsgWrite2==0)/nwords)
% calculate the accuracy of BCH-NN-BCH for correct
decoding. Decoding to different valid codeword is treated as
error here.
```

What is claimed is:

1. An apparatus comprising:
 a codeword decoder; and
 a neural network coupled to the codeword decoder, the neural network to receive an uncorrectable erroneous codeword from the codeword decoder and to classify the uncorrectable erroneous codeword into a correctable erroneous codeword;
 wherein the correctable erroneous codeword comprises a reduced bit error count relative to the uncorrectable erroneous codeword.

2. The apparatus of claim 1, the neural network comprising a plurality of fully-connected hidden layers.

3. The apparatus of claim 1, all layers of the neural network being fully-connected layers.

4. An apparatus comprising:
 a codeword decoder; and
 a neural network coupled to the codeword decoder, the neural network to receive an uncorrectable erroneous codeword from the codeword decoder and to classify the uncorrectable erroneous codeword into a correctable erroneous codeword,
 the neural network further to provide an error signal to the codeword decoder that the uncorrectable erroneous codeword is uncorrectable.

5. The apparatus of claim 4, the codeword decoder to output a read error for the uncorrectable erroneous codeword in response to receipt of the error signal.

6. An apparatus comprising:
 a codeword decoder; and
 a neural network coupled to the codeword decoder, the neural network to receive an uncorrectable erroneous codeword from the codeword decoder and to classify the uncorrectable erroneous codeword into a correctable erroneous codeword,
 the neural network further receiving a runtime bit error rate and memory array health parameters for a memory array.

7. The apparatus of claim 6, the neural network comprising an input layer comprising a first neuron to receive the uncorrectable erroneous codeword, a second neuron to receive the runtime bit error rate, and a third neuron to receive the memory array health parameters.

8. An apparatus comprising:
 a codeword decoder; and
 a neural network coupled to the codeword decoder, the neural network to receive an uncorrectable erroneous codeword from the codeword decoder and to classify the uncorrectable erroneous codeword into a correctable erroneous codeword,
 the neural network configured by applying results of a test on a memory array, the results of the test comprising:
  a plurality of noisy codewords read from the memory array during the test;
  an average bit error rate for the test; and
  memory array health parameters determined by the test.

9. An apparatus comprising:
 a codeword decoder; and
 a neural network coupled to the codeword decoder, the neural network to receive an uncorrectable erroneous codeword from the codeword decoder and to classify the uncorrectable erroneous codeword into a correctable erroneous codeword, the neural network comprising a plurality of hidden layers, each comprising exactly N neurons where N is a bit length of codewords of a memory array.

10. The apparatus of claim 9, the neural network comprising a Softmax output layer comprising N neurons.

11. The apparatus of claim 9, the plurality of hidden layers comprising between 2 and N/2 hidden layers, inclusive.

12. An error correction unit for a memory system, the error correction unit comprising:
 a codeword decoder interoperable with a neural network, the codeword decoder responsive to a received codeword determined to be an uncorrectable erroneous codeword by operating the neural network to convert the uncorrectable erroneous codeword into a returned correctable erroneous codeword having a reduced bit error count relative to the uncorrectable erroneous codeword; and the codeword decoder operating independently of the neural network when the received codeword is determined to be a received correctable erroneous codeword.

13. The error correction unit of claim 12, the codeword decoder responding to the returned correctable erroneous codeword by applying an error correcting code for the codeword to generate a non-erroneous codeword.

14. The error correction unit of claim 12, the codeword decoder responding with a read error signal as a result of receiving an error signal from the neural network indicating that the uncorrectable erroneous codeword is uncorrectable.

15. The error correction unit of claim 12, the neural network comprising a plurality of fully-connected hidden layers.

16. The error correction unit of claim 12, all layers of the neural network being fully-connected layers.

17. The error correction unit of claim 12, the neural network comprising an input layer comprising a first neuron to receive the uncorrectable erroneous codeword, a second neuron to receive an average bit error rate for a memory array, and a third neuron to receive memory array health parameters for the memory array.

18. The error correction unit of claim 12, the neural network comprising:

a plurality of fully-connected hidden layers each comprising at least N neurons where N is a bit length of codewords of a memory array.

19. The error correction unit of claim 18, the neural network comprising a gradient descent backpropagation learning function.

* * * * *